Oct. 29, 1963

H. THIEL 3,108,326

CLOSURE FOR THE DIE CYLINDER OF DIE-CASTING
MACHINES FOR THERMOPLASTIC MATERIAL

Filed Aug. 5. 1960

INVENTOR
Horst Thiel

Oct. 29, 1963

H. THIEL 3,108,326

CLOSURE FOR THE DIE CYLINDER OF DIE-CASTING
MACHINES FOR THERMOPLASTIC MATERIAL

Filed Aug. 5. 1960

INVENTOR
Horst Thiel
By Ernest Chantague
Attorney

INVENTOR
Horst Thiel

INVENTOR
HORST THIEL
BY
ATTORNEY.

United States Patent Office 3,108,326
Patented Oct. 29, 1963

3,108,326
CLOSURE FOR THE DIE CYLINDER OF DIE-CASTING MACHINES FOR THERMOPLASTIC MATERIAL
Horst Thiel, Brugge, Westphalia, Germany, assignor to Firma Gebr. Battenfeld, Meinerzhagen, Westphalia, Germany, a corporation of Germany
Filed Aug. 5, 1960, Ser. No. 47,823
6 Claims. (Cl. 18—30)

The present invention relates to a closure for the die cylinder of die-casting machines for thermoplastic artificial material.

For the working of thermoplastic die-casting masses, the granule-shaped raw material is melted down and pressed through a nozzle into the die-cast mold by means of a cylindrical piston or a worm-like piston.

It is one object of the present invention to provide a closure for the die cylinder of die-casting machines of thermoplastic artificial material which can be used for the securing of the nozzle in the cylinder head, as well as of the cylinder head in the die-casting cylinder.

In the known die-casting cylinders, the closure of the cylinder and the securing of the nozzle, respectively, is brought about by screw connections. The sealing between the spray cylinder, the cylinder head or the nozzle takes place by tightening the screw connection, whereby the sealing face is disposed at a right angle or conically towards the cylinder axis. The screw connection has the drawback that due to the impact of the temperature, which at times amounts to 350° C., it is rather difficult to release the screw connection after an appreciable period of time and the thread often locks up. It is then necessary to drill out the nozzle or the cylinder head from the die-cast cylinder, which part is no more useable, as a matter of course, and must be replaced. This result is due to the fact that the sealing faces, which assume a right angle or a conical arrangement towards the cylinder axis, cannot seal up completely, due to the high casting pressure, so that the die-cast mass penetrates the space between the threads and burns.

A similar situation arises in connection with cylinder closures having a flange, which is screwed to the cylinder by means of a plurality of screw bolts. Furthermore, due to the plurality of screws, which by inadvertence may be tightened unequally, it is difficult to obtain a complete sealing. Furthermore, the release and the tightening of the required great number of screws is time-consuming. Here also the screw threads may lock up due to the impact of the high temperature. The screw must then be drilled out and the thread cut again.

It is still another object of the present invention to provide a closure for the die cylinder of die-casting machines for thermoplastic artificial material wherein a rotary latch or a locking ring having one or a plurality of wings, however, preferably two wings, is applied, whereby one part, for instance the nozzle or the cylinder head has projections, which may be inserted into corresponding complementary recesses of the other part, namely of the cylinder head and the die part cylinder, respectively, and which may be locked by a rotary movement, so that the connection can be brought about without any screw means.

It is quite apparent, that the closure designed in accordance with the present invention offers an appreciably economic advantage, since the cylinder may be opened fast and safely and the nozzle may be attached fast and reliably.

It must be taken into consideration that it happens sometimes, and particularly mainly during the working of waste material, that foreign bodies, which do not melt at plasticizing temperature, for instance brass waste, wood and stones, or the like, which even cannot be sorted out from the mass by means of magnets, plug up the nozzle and by all means require a removal and cleaning of the nozzle.

In order to avoid the disadvantageous fast locking of the thread during repeated lift of the known screw nozzles, it is conventional to apply a special grease to the thread, in order to make possible its easy release. This is likewise avoided by the present invention. The greasing has the disadvantage or drawback that the grease penetrates the inner cylinder space upon screwing in the nozzle again, thereby soiling the casting mass and leads to discoloring or formation of strips thereon. All these drawbacks are avoided by the present invention.

With these and other objects in view which will become apparent in the following detailed description, the present invention will be clearly understood in connection with the accompanying drawings, in which.

Figure 1:
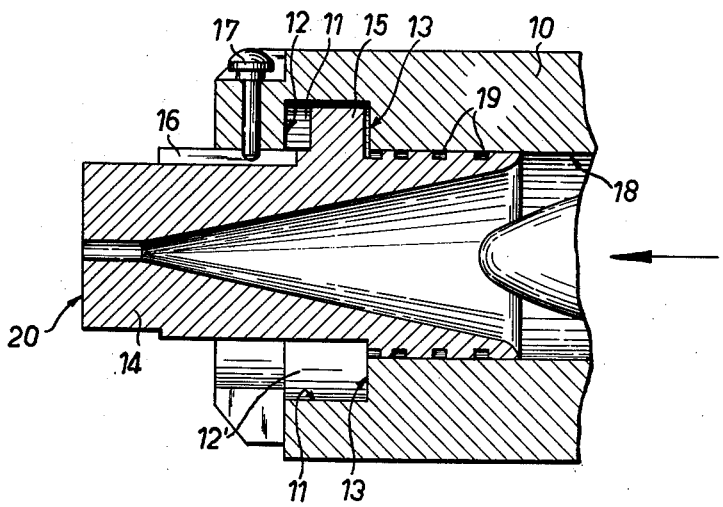
FIGURE 1 is an axial section along the lines 1—1 of FIG. 2 of a cylinder head with a nozzle, the cylinder head consisting of two parts with a bayonet connection.
Figure 2:
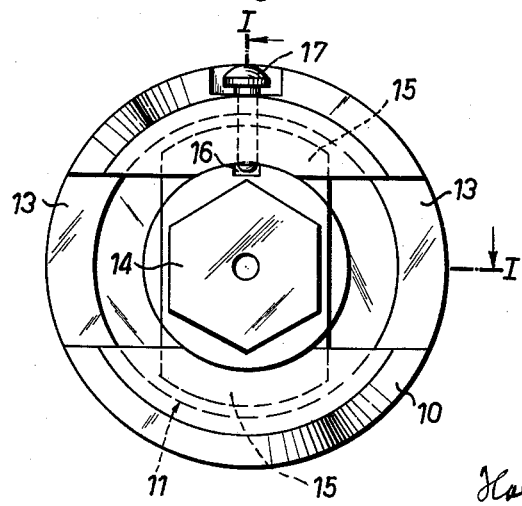
FIG. 2 is an end view of the closure shown in FIG. 1, seen from the left.

Referring now to the drawings, and in particular to FIGS. 1 and 2, the closure comprises a cylinder head 10 which is equipped with an inner annular groove 11, the latter providing two circular oppositely disposed abutment faces 12 and 13. The left-hand abutment face 12 is interrupted by a cross-wise disposed beaded border 12', whereby one part of a bayonet joint is created into which may be inserted the nozzle 14 having a flange 15 which nozzle 14 has, by means of its flange 15, two flat, parallel side faces. The annular groove 11 is wider in axial direction than the flat nozzle flange 15. By this arrangement, an axial movement of the nozzle 14 in the annular groove 11 is made possible. This has the appreciable advantage that the engagement pressure of the nozzle towards the tool is determined by the diameter of the cylindrical bore 18 of the cylinder head 10 and that damages to the nozzle 14 and to the tool due to high nozzle pressure is avoided.

In order to retain the nozzle 14 in its locking position, the nozzle 14 has a groove 16 into which a cylindrical pin 17 projects from above. The pin 17 remains in the groove 16 by its own weight and prevents, thereby, a rotation of the nozzle 14 in the cylinder head 10. The bore 18 in the cylinder head 10 is ground internally, so that the nozzle 14 has a good axial guide therein, which in turn permits a faultless cylindrical sealing. In order to increase the sealing effect, the nozzle 14 has a plurality of annular grooves 19 having sharp edges. The bore diameter of the nozzle 14 is comparatively large compared with the bore diameter 18 of the cylinder head 10, so that a low wall thickness is created and due to the casting pressure an increase in the nozzle 14 and, thereby, an engagement and better sealing of the nozzle 14 in the sealing bore 18 is made possible. In order to avoid any lateral pressure upon the nozzle 14, the hollow space which is conventional in die-cast moulds, into which the nozzle projects with a complementary camber, is of a flat configuration and the camber of the nozzle is replaced by a plane engagement face 20.

Figure 3:
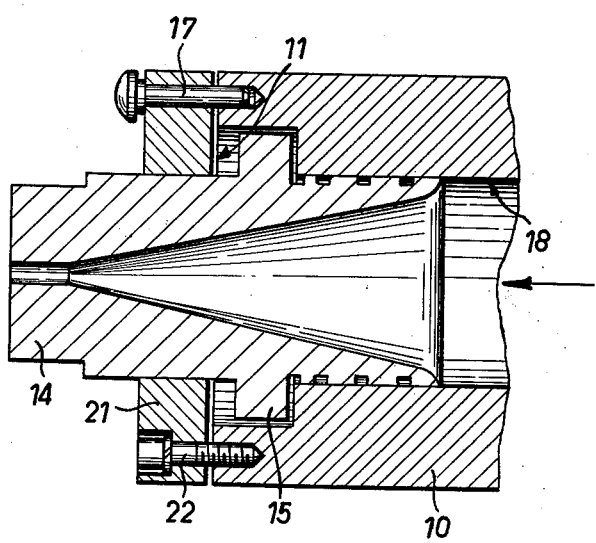
FIG. 3 is an axial section along the lines 3—3 of FIG. 4 through a nozzle closure consisting of three parts with a bayonet ring.
Figure 4:
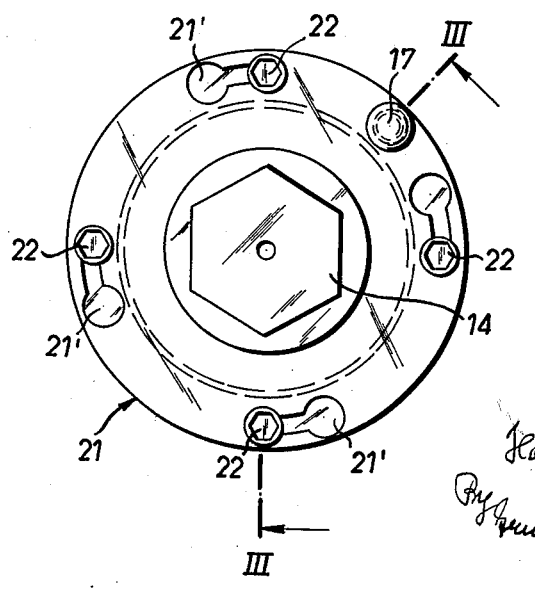
FIG. 4 is an end view of the closure shown in FIG. 3, seen from the left.

Referring now again to the drawings, and in particular to FIGS. 3 and 4, a second embodiment of the closure is there disclosed. In this embodiment the cylinder head 10, and the nozzle 14 are arranged in the same manner as in the first embodiment disclosed in FIGS. 1 and 2. Yet, this embodiment includes a bayonet ring 21 which has key-hole-slots 21', securing the ring 21 to the cylinder head 10, for instance by means of four screw bolts 22. The screw bolts 22 are adjusted as to their length in such a manner that a space is provided between the cylinder head 10 and the bayonet ring 21, so that upon removal of the bayonet ring 21, the thread has not to be loosened. A safety pin 17' is again provided against an undesired rotation of the bayonet ring 21. In this structure and in this embodiment, respectively, the right-hand abutment is again provided by one end face of the groove 11, while the left-hand abutment face is formed by the right-hand end face of the bayonet ring 21.

Figure 5:
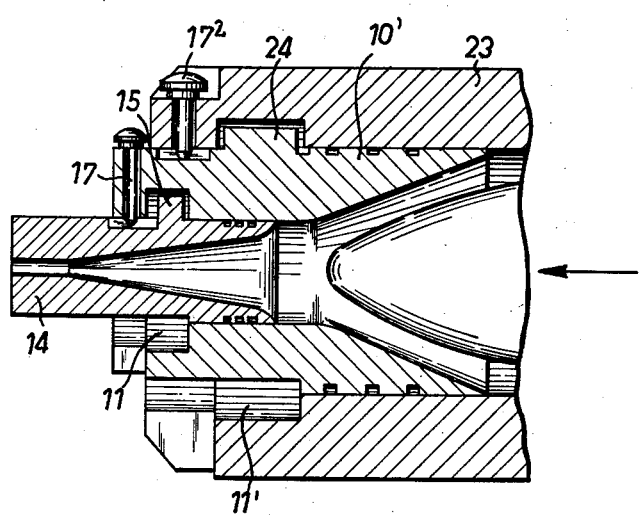
FIG. 5 is an axial section along the lines 5—5 of FIG. 6 of a die-cast cylinder in which the cylinder head and in the latter the nozzle, in accordance with the arrangement shown in FIG. 1 is inserted.
Figure 6:
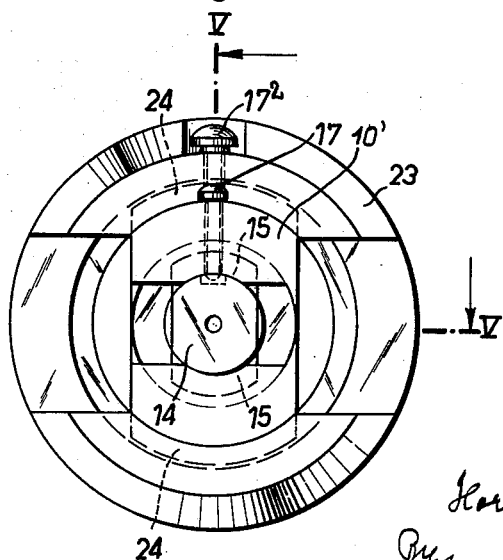
FIG. 6 is an end view of the embodiment shown in FIG. 5.

Referring now again to the drawings, and in particular to FIGS. 5 and 6, a third embodiment of the closure is disclosed. This embodiment comprises a cylinder head 10' designed and functioning in the manner of the cylinder head 10 of the embodiment shown in FIGS. 1 and 2, which cylinder head 10' is here, however, disposed within an outer cylinder 23. The axially movable nozzle 14 is again inserted into the cylinder head 10' in the same manner as disclosed in FIGS. 1 and 2.

The embodiment shown in FIGS. 5 and 6 comprises thus a double arrangement of a bayonet or locking joint, in which on the one hand the cylinder head 10' with its flattened flange portions 24 is received in an annular groove 11' of the outer cylinder 23, while the nozzle 14 with its flattened flange and its bayonet projections 15, respectively, rest in an annular groove 11 of the cylinder head 10. Both parts are secured in relative positions by means of pins 17 and 17², respectively. In this arrangement again the nozzle 14 is movable in axial direction due to the annular groove 11, which is wider in axial direction than the flange portions 15, whereby the flange portions 15 are practically resiliently chargeable by the pressure of the plasticized material.

Figure 7:
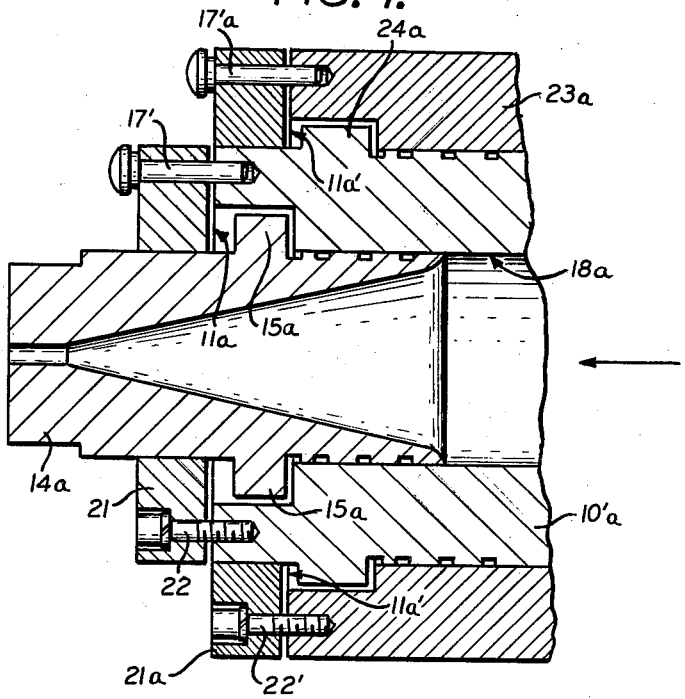
FIG. 7 is an axial section along the lines 7—7 of FIG. 8 of another embodiment of a die-cast cylinder in which the cylinder head and in the latter the nozzle are inserted.
Figure 8:
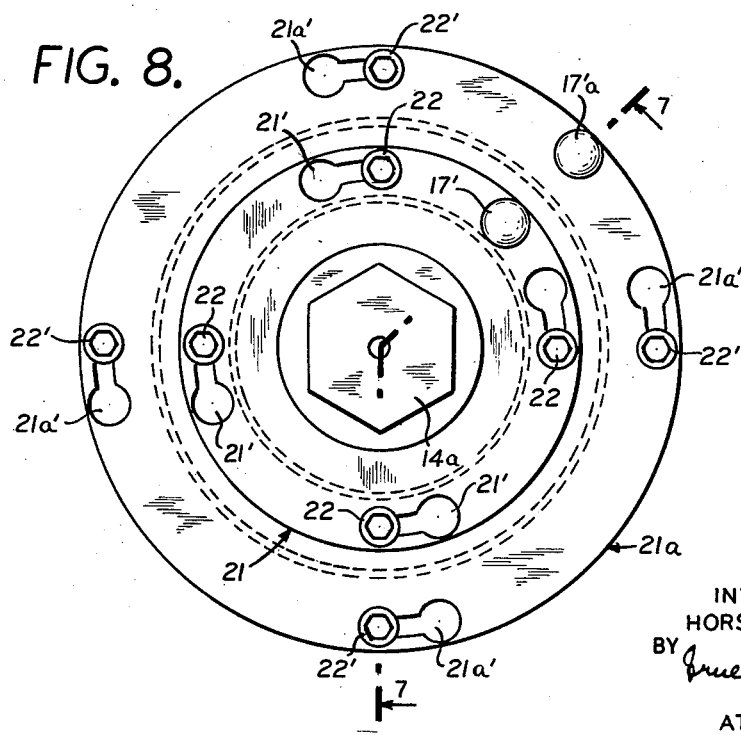
FIG. 8 is an end view of the embodiment shown in FIG. 7.

Referring now again to the drawings, and in particular to FIGS. 7 and 8, a fourth embodiment of the closure is disclosed which comprises again a cylinder head 10'a designed and functioning in the manner of the cylinder head 10 of the embodiment disclosed in FIGS. 1 and 2. The cylinder head 10'a is here, however, disposed within an outer cylinder 23a and the axially movable nozzle 14a is again inserted into the cylinder head 10'a, in the same manner as disclosed in FIGS. 1 and 2. This embodiment includes two bayonet or locking joints, one of the bayonet joints comprising flattened flange portions 24a of the cylinder head 10'a which are received in an annular groove 11a' of the outer or die-cast cylinder 23a, and the other of the bayonet joints comprising flattened flange portion 15a which are received in an annular groove 11a of the cylinder head 10'a. An arrangement which is similar to that disclosed in FIGS. 3 and 4 is provided in this embodiment, namely a bayonet ring 21 which has key-hole-slots 21', is secured to the cylinder head 10'a, for instance by means of four screw bolts 22, the ring 21 turning about the nozzle 14a. Furthermore, a second bayonet ring 21a which has key-hole-slots 21'a is secured to the outer or die-cast cylinder 23a, for instance by four screw bolts 22a, the ring 21a turning about the cylinder head 10'a. The rings 21 and 21a are easily removable upon a slight rotation for the length of the key-hole-slots, without removing the screw bolts 22 and 22', respectively. Axially disposed safety pins 17' and 17'a inserted in the rings 21 and 21a and received in corresponding bores of the cylinder head 10'a and the die-cast cylinder 23a, respectively, prevent the rotation of the rings 21 and 21a.

As stated above, the shown and described embodiments constitute merely examples of the realization of the present invention, which is not limited thereto. Rather within the scope of the present invention other embodiments and applications are possible, particularly in relation to the structure and the number of flange projections and recesses, respectively, of a rotary lock ring or bayonet ring, as it has been pointed out already in comparing the embodiments disclosed in FIG. 1 on the one hand, and FIG. 3 on the other hand, the scope of the present invention being determined by the objects and the claims.

I claim:

1. A closure for the die-cylinder of die-casting machines for thermoplastic artificial material for the securing of a nozzle head and of a cylinder head in said die-cylinder, comprising a cylinder head, a nozzle head received by and axially movable in said cylinder head, said cylinder head and said nozzle head constituting elements to be releasably coupled together, one of said elements having a recess open forwardly at two diametrically opposite open zones, the other of said elements having diametrically opposite flanges complementary to said recess and extending angularly for a length substantially equal with that of said open zones of said one of said elements, so that open relative rotation of said elements for about 90° said nozzle head is axially removable from said cylinder head, and said recess being of greater axial width than the axial width of said flanges, so that said other of said elements is axially movable relative to said one of said elements while in operative locking position and yieldingly chargeable by the pressure of the thermoplastic artificial material.

2. The closure, as set forth in claim 1, wherein said flanges comprise coupling latches and said complementary recess being formed as an annular groove having an axially arranged entrance recess complementary to said coupling latch, so that said annular groove is accessible through said entrance recess by said coupling latch in axial direction from the front of said closure.

3. The closure, as set forth in claim 1, wherein said cylinder head defines a bore, the latter being ground internally, said nozzle head has at its peripheral face a plurality of sharp edged annular grooves, and said peripheral face of said nozzle head being guided in said bore of said cylinder head.

4. The closure, as set forth in claim 1, wherein said nozzle head and said cylinder head, respectively, has an axially disposed groove, and a safety pin disposed radially and received in said groove and retaining said nozzle head and said cylinder head, respectively, against relative rotation.

5. The closure, as set forth in claim 4, wherein said safety pin is disposed vertically in said nozzle head and said cylinder head, respectively, and is retained in operative rotary preventing position by its own weight.

6. A closure for the die-cylinder of die-casting machines for thermoplastic artificial material for the securing of a nozzle head and of a cylinder head in said die-cylinder, comprising a cylinder head having a cylindrical bore, a nozzle head received by and axially movable in said bore of said cylinder head, said cylinder head having at its front end face an annular recess open at said front end face and at said cylindrical bore, said nozzle head having an annular flange extending from its periphery and disposed intermediate its ends, said annular flange being received in said annular recess, said annular flange having an axial length shorter than that of said annular recess in order to permit axial movement of said nozzle head, said nozzle head having at its outer face rearwardly from said flange a plurality of sealing rings cooperating with said bore of said cylinder head, a closure ring surrounding the front portion of said nozzle head and engaging the front end face of said cylinder head and to form an abutment for said flange during the forward movement of said nozzle head, and a plurality of axially disposed head screws rigidly mounted in said cylinder head and angularly spaced apart from each other, said closure ring having key-hole shaped circular recesses receiving a portion of the stem of said head screws, so that upon slight rotation of said closure ring, the latter is removable without removal of said head screws, thus permitting removal of said nozzle head.

References Cited in the file of this patent

UNITED STATES PATENTS

| | | |
|---|---|---|
| 17,855 | Gale | July 21, 1857 |
| 1,148,824 | Boje | Aug. 3, 1915 |
| 2,804,649 | Hupfield | Sept. 3, 1957 |
| 2,865,050 | Strauss | Dec. 23, 1958 |
| 2,908,037 | Harkenrider | Oct. 13, 1959 |
| 2,875,311 | Harkenrider | Feb. 24, 1959 |

FOREIGN PATENTS

| | | |
|---|---|---|
| 389,442 | France | June 29, 1908 |